United States Patent
Reker et al.

(10) Patent No.: US 9,773,006 B1
(45) Date of Patent: Sep. 26, 2017

(54) TECHNIQUES FOR MANAGING NON-SNAPPABLE VOLUMES

(75) Inventors: Matthew M. Reker, Blaine, MN (US); Timothy M. Naftel, Longmont, CO (US)

(73) Assignee: Veritas Technologies LLC, Mountain View, CA (US)

( * ) Notice: Subject to any disclaimer, the term of this patent is extended or adjusted under 35 U.S.C. 154(b) by 353 days.

(21) Appl. No.: 13/397,547

(22) Filed: Feb. 15, 2012

(51) Int. Cl.
*G06F 17/30* (2006.01)

(52) U.S. Cl.
CPC .............................. *G06F 17/30088* (2013.01)

(58) Field of Classification Search
CPC ............... G06F 17/30088; G06F 3/065; G06F 2201/82; G06F 2201/84; G06F 11/14; G06F 11/1451; G06F 11/1466; G06F 11/1446
USPC ............................ 707/640, 649, 639; 714/48
See application file for complete search history.

(56) References Cited

U.S. PATENT DOCUMENTS

| | | | |
|---|---|---|---|
| 6,078,932 A * | 6/2000 | Haye et al. | |
| 6,477,629 B1 * | 11/2002 | Goshey et al. | 711/162 |
| 7,865,663 B1 * | 1/2011 | Nelson et al. | 711/112 |
| 2002/0019908 A1 * | 2/2002 | Reuter et al. | 711/112 |
| 2003/0028736 A1 * | 2/2003 | Berkowitz et al. | 711/162 |
| 2007/0244938 A1 * | 10/2007 | Michael et al. | 707/204 |
| 2008/0307175 A1 * | 12/2008 | Hart et al. | 711/162 |
| 2009/0216816 A1 * | 8/2009 | Basler et al. | 707/204 |
| 2009/0216970 A1 * | 8/2009 | Basler et al. | 711/162 |
| 2010/0241654 A1 * | 9/2010 | Wu | G06F 17/30233 707/769 |

OTHER PUBLICATIONS

VMware Workstation 6.0 User's Manual. Aug. 28, 2008. <http://www.vmware.com/pdf/ws6_manual.pdf>.*

* cited by examiner

*Primary Examiner* — Dennis Truong
(74) *Attorney, Agent, or Firm* — Wilmer Cutler Pickering Hale and Dorr LLP (57) ABSTRACT

Techniques for managing non-snappable volumes are disclosed. In one particular exemplary embodiment, the techniques may be realized as a method for managing non-snappable volumes comprising identifying a virtual disk associated with a virtual machine, identifying a non-snappable volume associated with the virtual disk, analyzing the non-snappable volume, using at least one computer processor, to determine whether the non-snappable volume contains application data, and performing one or more responsive actions in the event the non-snappable volume is determined to contain application data.

17 Claims, 4 Drawing Sheets

TECHNIQUES FOR MANAGING NON-SNAPPABLE VOLUMES

FIELD OF THE DISCLOSURE

The present disclosure relates generally to virtual machine backups and, more particularly, to techniques for managing non-snappable volumes.

BACKGROUND OF THE DISCLOSURE

The use of virtual machines is growing. Backup of data associated with virtual machines may be more important as more applications are now hosted on virtual machines. Certain types of volumes may not be visible to a process backing up data on a virtual machine. For example, if a disk of a virtual machine is configured as an independent mode virtual disk, it may be excluded from snapshots of the virtual machine or non-snappable. Additionally, raw device mappings which may provide access for a virtual machine to a raw device or a Logical Unit Number (LUN) may not be included in snapshots (i.e., may be non-snappable) and/or backups. Thus, application data stored on non-snappable volumes may be excluded from backup and at risk of loss and/or corruption.

In view of the foregoing, it may be understood that there may be significant problems and shortcomings associated with current non-snappable volume management technologies.

SUMMARY OF THE DISCLOSURE

Techniques for managing non-snappable volumes are disclosed. In one particular exemplary embodiment, the techniques may be realized as a method for managing non-snappable volumes comprising identifying a virtual disk associated with a virtual machine, identifying a non-snappable volume associated with the virtual disk, analyzing the non-snappable volume, using at least one computer processor, to determine whether the non-snappable volume contains application data, and performing one or more responsive actions in the event the non-snappable volume is determined to contain application data.

In accordance with other aspects of this particular exemplary embodiment, the techniques may further comprise mapping virtual disk information into mount point information to allow analysis of the non-snappable volume.

In accordance with further aspects of this particular exemplary embodiment, identifying the virtual disk associated with the virtual machine may comprise querying a hypervisor.

In accordance with additional aspects of this particular exemplary embodiment, the non-snappable volume may comprise an independent mode virtual disk.

In accordance with additional aspects of this particular exemplary embodiment, the non-snappable volume may comprise a Raw Device Mapping (RDM).

In accordance with additional aspects of this particular exemplary embodiment, analyzing the non-snappable volume, using at least one computer processor, to determine whether the non-snappable volume contains application data may comprise identifying one or more files associated with an application of the virtual machine, and determining whether at least one of the one or more files associated with an application of the virtual machine are present on the non-snappable volume.

In accordance with additional aspects of this particular exemplary embodiment, analyzing the non-snappable volume to determine whether the non-snappable volume contains application data may be performed by a backup agent on the virtual machine.

In accordance with additional aspects of this particular exemplary embodiment, the backup agent may be an application specific backup agent.

In accordance with additional aspects of this particular exemplary embodiment, performing one or more responsive actions in the event the non-snappable volume is determined to contain application data may comprise providing a notification that data on the non-snappable volume will not be backed up.

In accordance with additional aspects of this particular exemplary embodiment, performing one or more responsive actions in the event the non-snappable volume is determined to contain application data may comprise adding the non-snappable volume to a backup process.

In accordance with additional aspects of this particular exemplary embodiment, identifying a non-snappable volume associated with the virtual disk may comprise querying a backup client on a virtual machine.

In accordance with additional aspects of this particular exemplary embodiment, analyzing the non-snappable volume to determine whether the non-snappable volume contains application data may be performed by a backup server.

In accordance with additional aspects of this particular exemplary embodiment, the application data may comprise one or more database files.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing one or more of the methods.

In another particular exemplary embodiment, the techniques may be realized as an article of manufacture for managing non-snappable volumes, the article of manufacture comprising at least one non-transitory processor readable storage medium, and instructions stored on the at least one storage medium. The instructions may be configured to be readable from the at least one storage medium by at least one processor and thereby cause the at least one processor to operate so as to identify a virtual disk associated with a virtual machine, identify a non-snappable volume associated with the virtual disk, analyze the non-snappable volume to determine whether the non-snappable volume contains application data, and perform one or more responsive actions in the event the non-snappable volume is determined to contain application data.

In yet another particular exemplary embodiment, the techniques may be realized as a system for managing non-snappable volumes comprising one or more processors communicatively coupled to a network. The one or more processors may be configured to identify a virtual disk associated with a virtual machine, identify a non-snappable volume associated with the virtual disk, analyze the non-snappable volume to determine whether the non-snappable volume contains application data, and perform one or more responsive actions in the event the non-snappable volume is determined to contain application data.

In accordance with additional aspects of this particular exemplary embodiment, the non-snappable volume may comprise an independent mode virtual disk.

In accordance with additional aspects of this particular exemplary embodiment, the non-snappable volume may comprise a Raw Device Mapping (RDM).

In accordance with additional aspects of this particular exemplary embodiment, analyzing the non-snappable volume to determine whether the non-snappable volume contains application data may comprise identifying one or more files associated with an application of the virtual machine, and determining whether at least one of the one or more files associated with an application of the virtual machine are present on the non-snappable volume.

In accordance with additional aspects of this particular exemplary embodiment, analyzing the non-snappable volume to determine whether the non-snappable volume contains application data may be performed by a backup agent on the virtual machine.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
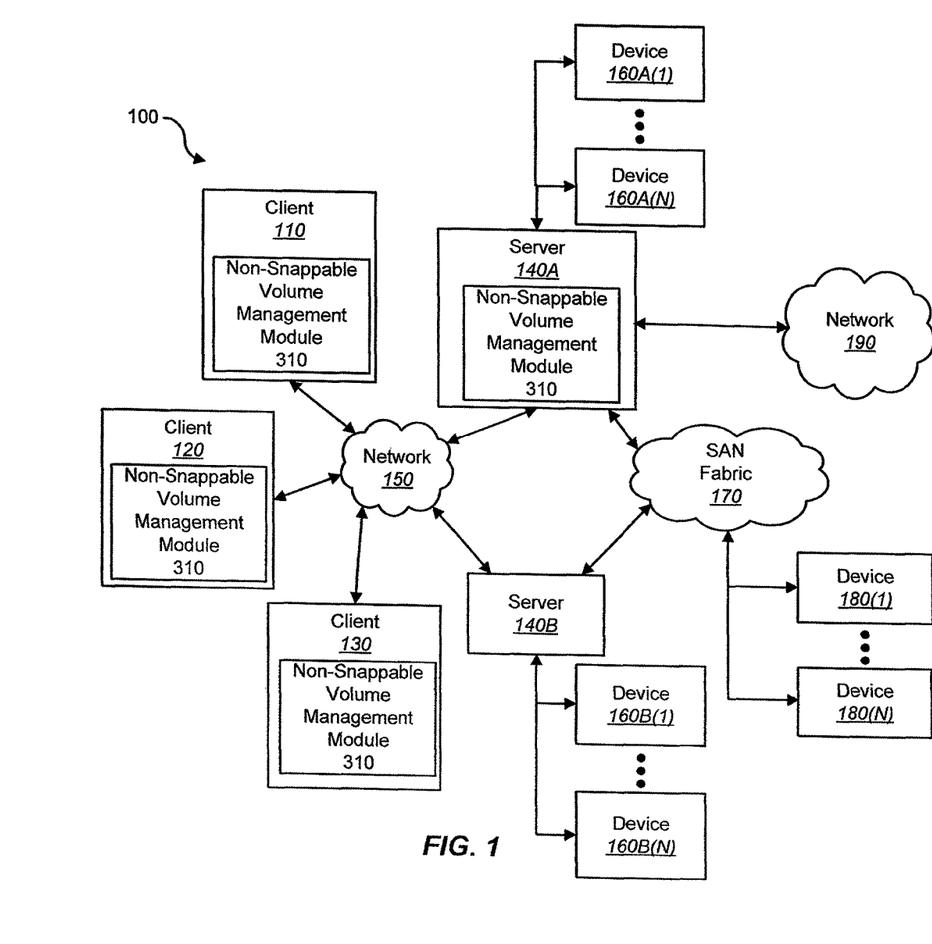
FIG. 1 shows a block diagram depicting a network architecture for managing non-snappable volumes in accordance with an embodiment of the present disclosure.

FIG. 1 shows a block diagram depicting a network architecture 100 for managing non-snappable volumes in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., non-snappable volume management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
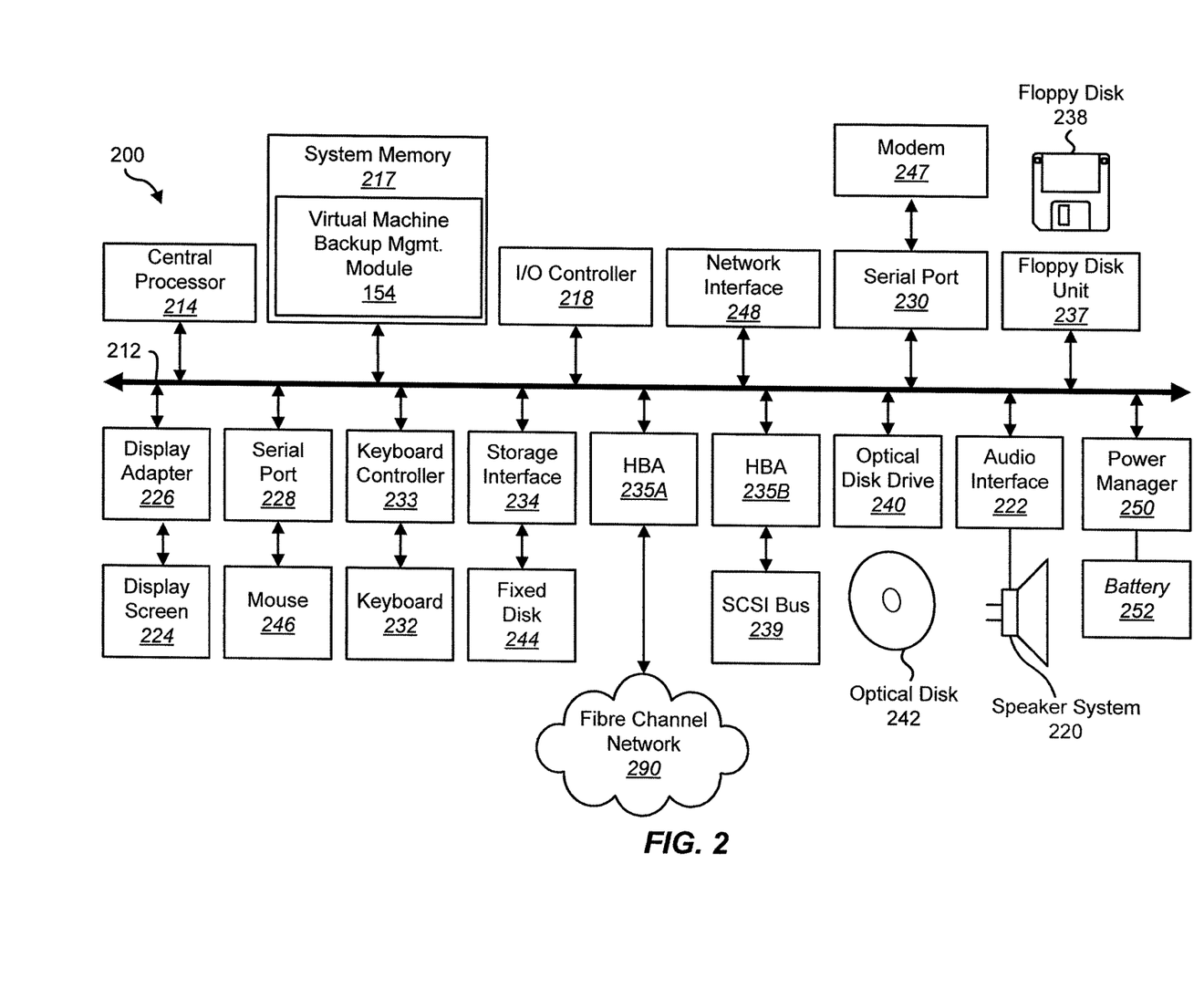
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface. According to some embodiments, clients 110, 120, and 130 may be virtual machines.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for management of non-snappable volumes such as, for example, non-snappable volume management module 154. As illustrated, one or more portions of a non-snappable volume management module may reside at a network centric location. For example, server 140A may be a server, a firewall, a gateway, or other network element that may perform one or more actions to manage a non-snappable volume. According to some embodiments, network 190 may be an external network (e.g., the Internet) and server 140A may be a gateway or firewall between one or more internal components and clients and the external network.

Non-snappable volume management module 154 may detect backup of a virtual machine. For example, one or more portions of non-snappable volume management module 154 may be present on a backup server (e.g., server 140A) and may detect a backup process associated with a virtual machine. Non-snappable volume management module 154 may query a backup server, a virtual machine server, and/or a hypervisor to identify one or more virtual disks associated with the virtual machine. Non-snappable volume management module 154 may obtain device controller target and Logical Unit Number (LUN) information. Non-snappable volumes (e.g., independent mode virtual disks and Raw Device Mappings) associated with the virtual disk information may be identified. Non-snappable volume management module 154 may collect information such as, for example, the information listed in table 1, including controller type, controller ID, disk ID, and disk type.

TABLE 1

| Virtual Disk | Controller Type | Controller ID | Disk ID | Disk Type |
|---|---|---|---|---|
| Disk1.vmdk | IDE | Master | 0 | Normal |
| Disk2.vmdk | SCSI | 0 | 0 | Normal |
| Disk3.vmdk | SCSI | 0 | 1 | Independent |
| Disk4.vmdk | SCSI | 0 | 2 | Normal |
| Disk5.vmdk | SCSI | 1 | 0 | RDM |

According to some embodiments, one or more portions of Non-snappable volume management module 154 may reside on a backup server. A portion of non-snappable volume management module 154 residing on a backup server or a virtual machine server may pass information associated with the one or more virtual disks to a portion of non-snappable volume management module 154 residing on a client or virtual machine (illustrated as non-snappable volume management module 154 on clients 110, 120, and/or 130). If a virtual machine being backed up is a Windows platform, the portion of non-snappable volume management module 154 running on a virtual machine (e.g., as an agent) may map the physical disks to the virtual disks (e.g., using a Windows API). Windows may assign a physical drive number staring with IDE master (Disk ID 0 then 1), IDE slave (Disk 0 then 1), and SCSI (controller ID, then Disk ID). In the example illustrated in table 1, the Windows physical disk to virtual disk mappings may be configured as illustrated in Table 2.

TABLE 2

| Physical Disk | Virtual Disk | Disk Type |
|---|---|---|
| 0 | Disk1.vmdk | Normal |
| 1 | Disk2.vmdk | Normal |
| 2 | Disk3.vmdk | Independent |

TABLE 2-continued

| Physical Disk | Virtual Disk | Disk Type |
|---|---|---|
| 3 | Disk4.vmdk | Normal |
| 4 | Disk5.vmdk | RDM |

The agent may then map the virtual disk information into mount point information to access the non-snappable volume. Non-snappable volume management module 154 may then analyze the non-snappable volume to determine whether the non-snappable volume contains application data.

According to some embodiments, non-snappable volume management module 154 may determine whether a non-snappable volume contains application data by identifying one or more files associated with an application of the virtual machine, and determining whether at least one of the one or more files associated with an application of the virtual machine are present on the non-snappable volume. According to one or more embodiments, a backup agent on a virtual machine may determine whether a non-snappable volume contains application data. A backup agent may be an application specific backup agent which may contain logic for identifying data necessary or part of a specific application. For example, non-snappable volume management module 154 may interface and/or contain a backup agent specific to a database, an email program, or another application. According to some embodiments, a module or agent of non-snappable volume management module 154 may reside on a virtual machine and may provide a listing of file names, file types, or other metadata about the contents of a non-snappable volume to a backup server. A module of non-snappable volume management module 154 on the backup server may determine, based on an application associated with the virtual machine, whether the non-snappable volume contains application data (e.g., log files for a database).

In the event a non-snappable volume is determined to contain application data, non-snappable volume management module 154 may perform one or more responsive actions. non-snappable volume management module 154 may provide a notification that data on the non-snappable volume will not be backed up. A notification may be provided during the initiation or configuration of a backup to provide warning to a user. Notifications may be provided through a user interface, via email, or other electronic communications. According to some embodiments, non-snappable volume management module 154 may add the non-snappable volume to a backup process.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, non-snappable volume management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
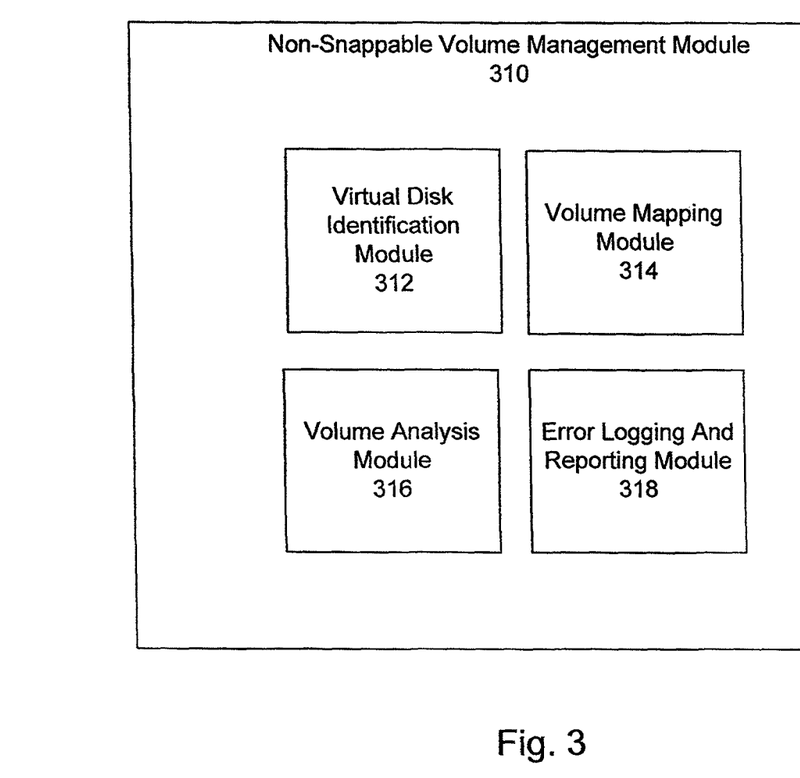
FIG. 3 shows a module for managing non-snappable volumes in accordance with an embodiment of the present disclosure.

Referring to FIG. 3, there is shown a non-snappable volume management module 310 in accordance with an embodiment of the present disclosure. As illustrated, the non-snappable volume management module 310 may contain one or more components including virtual disk identification module 312, volume mapping module 314, volume analysis module 316, and error logging and reporting module 318.

The description below describes network elements, computers, and/or components of a system and method for managing non-snappable volumes that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Virtual disk identification module 312 may detect backup of a virtual machine. For example, one or more portions of virtual disk identification module 312 may be present on a backup server (e.g., server 140A) and may detect a backup process associated with a virtual machine. Virtual disk identification module 312 may query a virtual machine server and/or a hypervisor to identify one or more virtual disks associated with the virtual machine. For example, virtual disk identification module 312 may obtain device controller target and Logical Unit Number (LUN) information. Virtual disk information may include information such as, for example, controller type, controller ID, disk ID, and disk type (e.g., Normal, Independent, Raw Device Mapping (RDM)). Non-snappable volumes (e.g., independent mode virtual disks and Raw Device Mappings) associated with the virtual disk information may be identified. Virtual disk identification module 312 residing on a backup server or a virtual machine server may pass information associated with the one or more virtual disks to volume mapping module 314 residing on a client (illustrated as Non-snappable volume management module 154 on clients 110, 120, and/or 130).

Volume mapping module 314 may map the virtual disk information into mount point information to access a non-snappable volume. Volume mapping module 314 may then to provide access to Volume analysis module 316 to analyze the non-snappable volume to determine whether the non-snappable volume contains application data. According to some embodiments, Volume mapping module 314 may provide metadata about the content of a non-snappable volume to Volume analysis module 316. For example, volume mapping module 314 may be a portion of or access an agent on a virtual machine and may provide metadata about a non-snappable volume to a module on a backup server. For example, if a virtual machine being backed up is a Windows platform, volume mapping module 314 may map the physical disks to the virtual disks (e.g., using a Windows API). Volume mapping module 314 may assign a physical drive number staring with IDE master (Disk ID 0 then 1), IDE slave (Disk 0 then 1), and SCSI (controller ID, then Disk ID).

According to some embodiments, volume analysis module 316 may determine whether a non-snappable volume contains application data by identifying one or more files associated with an application of the virtual machine, and determining whether at least one of the one or more files associated with an application of the virtual machine are present on the non-snappable volume. According to one or more embodiments, a backup agent on a virtual machine may determine whether a non-snappable volume contains application data. A backup agent may be an application specific backup agent which may contain logic for identifying data necessary or part of a specific application. For example, Volume analysis module 316 may interface and/or contain a backup agent specific to a database, an email program, or another application. According to some embodiments, volume analysis module 316 may reside on a backup server and may determine, based on an application associated with the virtual machine, whether the non-snappable volume contains application data (e.g., log files for a database).

In the event a non-snappable volume is determined to contain application data, volume analysis module 316 may perform one or more responsive actions. Volume analysis module 316 may provide a notification that data on the non-snappable volume will not be backed up. A notification may be provided during the initiation or configuration of a backup to provide warning to a user. Notifications may be provided through a user interface, via email, or other electronic communications. According to some embodiments, Volume analysis module 316 may add the non-snappable volume to a backup process.

Error logging and reporting module 318 may produce logs, reports, or other information associated with managing non-snappable volumes.

Figure 4:
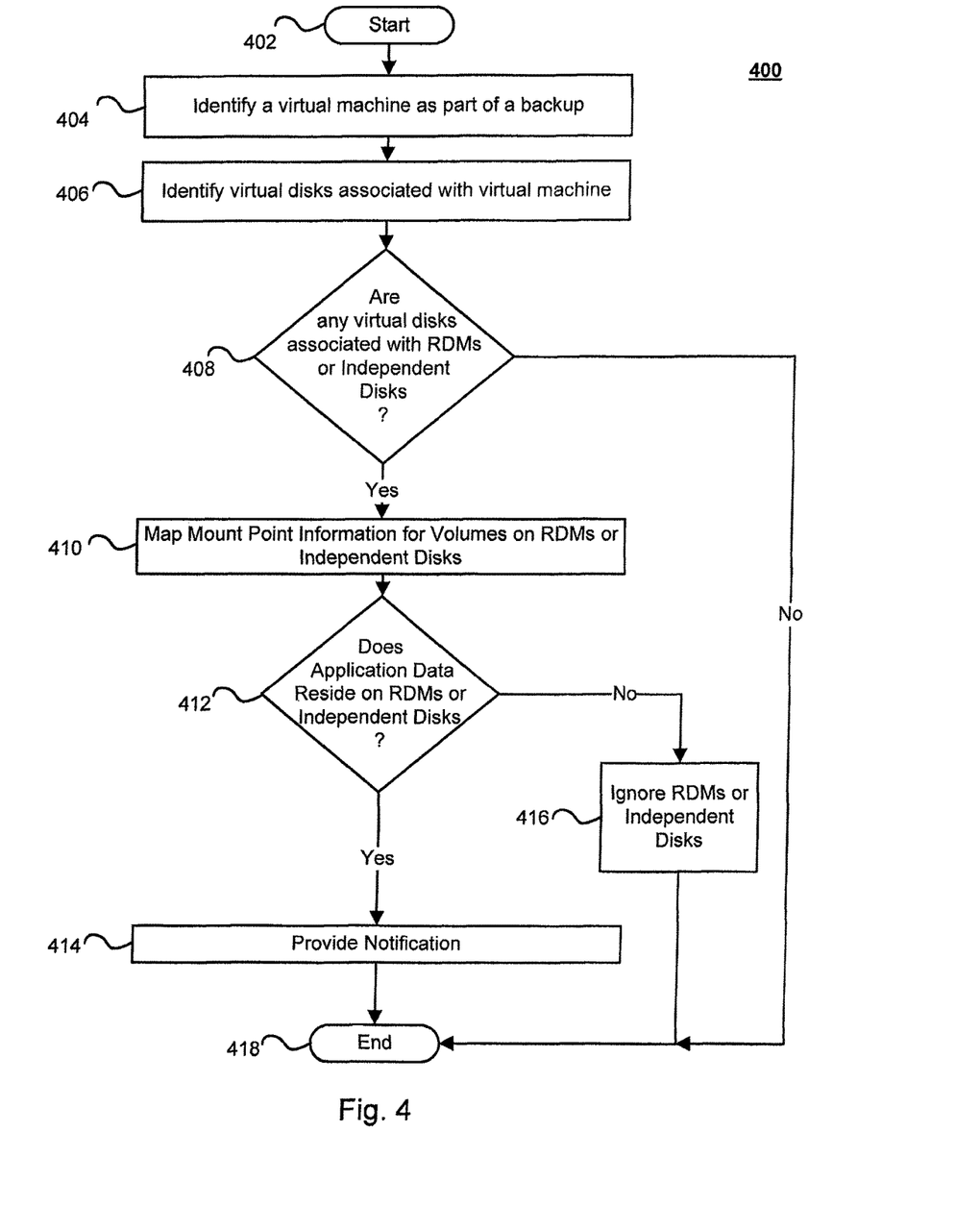
FIG. 4 depicts a method for managing non-snappable volumes in accordance with an embodiment of the present disclosure.

Referring to FIG. 4, there is depicted a method 400 for managing non-snappable volumes in accordance with an embodiment of the present disclosure. At block 402, the method 400 may begin.

At block 404, backup of data of a virtual machine may be detected. For example, a module on a backup server or a virtual machine may detect a backup process associated with a virtual machine.

At block 406, one or more virtual disks associated with the virtual machine may be identified. A backup server, a virtual machine server, and/or a hypervisor may be queried to identify one or more virtual disks associated with a virtual machine. For example, device controller target and Logical Unit Number (LUN) information associated with a virtual machine may be obtained. Information may include, for example, controller type, controller ID, disk ID, and disk type.

At block 408, it may be determined whether one or more virtual disks of a virtual machine are associated with non-snappable volumes. Non-snappable volumes (e.g., independent mode virtual disks and Raw Device Mappings) associated with the virtual disk information may be identified. For example, if a disk of a virtual machine is configured as an independent mode virtual disk, it may be excluded from snapshots of the virtual machine or non-snappable. Additionally, raw device mappings which may provide access for a virtual machine to a raw device or a Logical Unit Number (LUN) may not be included in snapshots (i.e., may be non-snappable) and/or backups. Thus application data stored on non-snappable volumes may be excluded from backup and at risk of loss and/or corruption. If any virtual disks are associated with non-snappable volumes, the method may continue at block 410. If no virtual disks of a virtual machine being backed up are associated with non-snappable volumes, the method 400 may end at block 418.

At block 410, information associated with a virtual disk may be used to map the virtual disk information into mount point information to access the non-snappable volume. If a virtual machine being backed up is a Windows platform, the physical disks may be mapped to the virtual disks in accordance with Windows standards (e.g., using a Windows API). Windows may assign a physical drive number staring with IDE master (Disk ID 0 then 1), IDE slave (Disk 0 then 1), and SCSI (controller ID, then Disk ID).

At block 412, a non-snappable volume may then be analyzed to determine whether the non-snappable volume contains application data. According to some embodiments, analysis of a non-snappable volume may include identifying one or more files associated with an application of the virtual machine and determining whether at least one of the one or more files associated with an application of the virtual machine are present on the non-snappable volume. According to one or more embodiments, a backup agent on a virtual machine may determine whether a non-snappable volume contains application data. A backup agent may be an application specific backup agent which may contain logic for identifying data necessary or part of a specific application. According to some embodiments, a backup server may determine, based on an application associated with the virtual machine, whether the non-snappable volume contains application data (e.g., log files for a database).

In the event a non-snappable volume is determined to contain application data, the method 400 may continue at block 414. In the event a non-snappable volume is determined not to contain application data, the method 400 may continue at block 416.

At block 416, non-snappable volumes such as, for example, Raw Device Mappings and Independent Mode virtual disks may be ignored.

At block 414, one or more responsive actions may be performed. For example, a notification may be provided during the initiation or configuration of a backup to provide warning to a user. According to some embodiments, a non-snappable volume may be added to a backup process.

At block 418, the method 400 may end.

At this point it should be noted that managing non-snappable volumes in accordance with the present disclosure as described above typically involves the processing of input data and the generation of output data to some extent. This input data processing and output data generation may be implemented in hardware or software. For example, specific electronic components may be employed in an non-snappable volume management module or similar or related circuitry for implementing the functions associated with managing non-snappable volumes in accordance with the present disclosure as described above. Alternatively, one or more processors operating in accordance with instructions may implement the functions associated with managing non-snappable volumes in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing non-snappable volumes comprising:
    detecting a backup process of a virtual machine;
    identifying a virtual disk associated with the virtual machine when the backup process is detected;
    determining whether a non-snappable volume is associated with the virtual disk;
    mapping information associated with the virtual disk into mount point information to allow analysis of the non-snappable volume and obtaining metadata about content of the non-snappable volume when it is determined that the non-snappable volume is associated with the virtual disk;
    analyzing the non-snappable volume via the mapped information and metadata, using at least one computer processor, to determine whether the non-snappable volume contains application data, wherein determining whether the non-snappable volume contains application data comprises:
        identifying one or more files associated with an application of the virtual machine; and
        determining whether at least one of the one or more files are present on the non-snappable volume;
        performing one or more responsive actions in the event the non-snappable volume is determined to contain application data, wherein performing one or more responsive actions in the event the non-snappable volume is determined to contain application data comprises providing a notification to a user during initiation or configuration of a backup that the non-snappable volume will not be backed up, and wherein the user notification provides a warning to the user through a user interface; and
        ignoring the non-snappable volume in the event the non-snappable volume is determined not to contain application data.

2. The method of claim 1, wherein identifying the virtual disk associated with the virtual machine comprises querying a hypervisor.

3. The method of claim 1, wherein the non-snappable volume comprises an independent mode virtual disk.

4. The method of claim 1, wherein the non-snappable volume comprises a Raw Device Mapping (RDM).

5. The method of claim 1, wherein analyzing the non-snappable volume to determine whether the non-snappable volume contains application data is performed by a backup agent on the virtual machine.

6. The method of claim 5, wherein the backup agent is an application specific backup agent.

7. The method of claim 1, wherein performing one or more responsive actions in the event the non-snappable volume is determined to contain application data comprises adding the non-snappable volume to the backup process.

8. The method of claim 1, wherein identifying a non-snappable volume associated with the virtual disk comprises querying a backup client on a virtual machine.

9. The method of claim 1, wherein analyzing the non-snappable volume to determine whether the non-snappable volume contains application data is performed by a backup server.

10. The method of claim 1, wherein the application data comprises one or more database files.

11. At least one non-transitory processor readable storage medium for storing a computer program of instructions configured to be readable by at least one processor for instructing the at least one processor to execute a computer process for performing the method as recited in claim 1.

12. The method of claim 1, wherein the user notification comprises an email.

13. An article of manufacture for managing non-snappable volumes, the article of manufacture comprising:
    at least one non-transitory processor readable storage medium; and
    instructions stored on the at least one storage medium;
    wherein the instructions are configured to be readable from the at least one storage medium by at least one processor and thereby cause the at least one processor to operate so as to:
        detect a backup process of a virtual machine;
        identify a virtual disk associated with the virtual machine when the backup process is detected;
        determine whether a non-snappable volume is associated with the virtual disk;
        map information associated with the virtual disk into mount point information to allow analysis of the non-snappable volume and obtain metadata about content of the non-snappable volume when it is determined that the non-snappable volume is associated with the virtual disk;
        analyze the non-snappable volume via the mapped information to determine whether the non-snappable volume contains application data, wherein determining whether the non-snappable volume contains application data comprises:
            identifying one or more files associated with an application of the virtual machine; and
            determining whether at least one of the one or more files are present on the non-snappable volume;
            performing one or more responsive actions in the event the non-snappable volume is determined to contain application data, wherein performing one or more responsive actions in the event the non-snappable volume is determined to contain application data comprises providing a notification to a user during initiation or configuration of a backup that the non-snappable volume will not be backed up, and wherein the user notification provides a warning to the user through a user interface; and
            ignoring the non-snappable volume in the event the non-snappable volume is determined not to contain application data.

14. A system for managing non-snappable volumes comprising:
    one or more processors communicatively coupled to a network, wherein the one or more processors are configured to:
        detect a backup process of a virtual machine;
        identify a virtual disk associated with the virtual machine when the backup process is detected;
        determine whether a non-snappable volume is associated with the virtual disk;
        map information associated with the virtual disk into mount point information to allow analysis of the non-snappable volume and obtaining metadata about content of the non-snappable volume when it is determined that the non-snappable volume is associated with the virtual disk;

analyze the non-snappable volume via the mapped information to determine whether the non-snappable volume contains application data, wherein determining whether the non-snappable volume contains application data comprises:
- identifying one or more files associated with an application of the virtual machine; and
- determining whether at least one of the one or more files are present on the non-snappable volume;

performing one or more responsive actions in the event the non-snappable volume is determined to contain application data, wherein performing one or more responsive actions in the event the non-snappable volume is determined to contain application data comprises providing a notification to a user during initiation or configuration of a backup that the non-snappable volume will not be backed up, and wherein the user notification provides a warning to the user through a user interface; and ignoring the non-snappable volume in the event the non-snappable volume is determined not to contain application data.

15. The system of claim 14, wherein the non-snappable volume comprises an independent mode virtual disk.

16. The system of claim 14, wherein the non-snappable volume comprises a Raw Device Mapping (RDM).

17. The system of claim 14, wherein analyzing the non-snappable volume to determine whether the non-snappable volume contains application data is performed by a backup agent on the virtual machine.

\* \* \* \* \*